(12) United States Patent
Yamamoto

(10) Patent No.: US 10,066,394 B2
(45) Date of Patent: Sep. 4, 2018

(54) BUILDING MATERIAL AND METHOD FOR PRODUCING THE SAME

(71) Applicant: Nichiha Corporation, Nagoya-shi, Aichi (JP)

(72) Inventor: Hiroaki Yamamoto, Nagoya (JP)

(73) Assignee: NICHIHA CORPORATION, Nagoya-Shi (JP)

( * ) Notice: Subject to any disclaimer, the term of this patent is extended or adjusted under 35 U.S.C. 154(b) by 23 days.

(21) Appl. No.: 14/633,479

(22) Filed: Feb. 27, 2015

(65) Prior Publication Data

US 2015/0247321 A1   Sep. 3, 2015

(30) Foreign Application Priority Data

Feb. 28, 2014  (JP) ................. 2014-037835

(51) Int. Cl.
*E04C 2/52* (2006.01)
*C09D 133/02* (2006.01)

(52) U.S. Cl.
CPC ............ *E04C 2/528* (2013.01); *C09D 133/02* (2013.01); *Y10T 428/24851* (2015.01)

(58) Field of Classification Search
None
See application file for complete search history.

(56) References Cited

U.S. PATENT DOCUMENTS

| 4,575,981 | A | * | 3/1986 | Porter | ................ E04D 3/355 52/309.9 |
|---|---|---|---|---|---|
| 6,333,365 | B1 | * | 12/2001 | Lucas | ................ C08J 9/141 521/64 |
| 6,402,419 | B1 | | 6/2002 | Watanabe | |
| 2011/0144247 | A1 | | 6/2011 | Campbell et al. | |
| 2011/0179740 | A1 | * | 7/2011 | Padmanabhan | .... B62D 25/2054 52/588.1 |

FOREIGN PATENT DOCUMENTS

| CA | 2169585 A1 | | 8/1997 |
|---|---|---|---|
| JP | 47-38690 | | 9/1972 |
| JP | 8-82066 A | | 3/1996 |
| JP | 11-30017 A | | 2/1999 |
| JP | 11-324276 A | | 11/1999 |
| JP | 2004083768 A | * | 3/2004 |
| JP | 2007-198098 A | | 8/2007 |
| JP | 2008-111316 A | | 5/2008 |
| RU | 2289004 C2 | | 12/2006 |
| RU | 103372 U1 | | 4/2011 |
| WO | WO 03/012224 A1 | | 2/2003 |

OTHER PUBLICATIONS

JP 2004-083768 Machine translation via AIPN webiste.*
Australian Office Action, dated Jul. 26, 2016, for Australian Application No. 2015200685.
Notification of Reasons for Refusal (including an English translation thereof) issued in the corresponding Japanese Patent Application No. 2014-037835 dated Feb. 14, 2017.
Office Action and Search Report issued in the corresponding Canadian Patent Application No. 2,881,381 dated Apr. 10, 2017.

* cited by examiner

*Primary Examiner* — Laura C Powers
(74) *Attorney, Agent, or Firm* — Birch, Stewart, Kolasch & Birch, LLP

(57) ABSTRACT

A building material having a caulking on a shiplap portion. The caulking is covered with a caulking-coating film. The building material demonstrates superior cuttability and adhesion with the shiplap portion and demonstrates almost free of staining caused by bleeding of the oil and the like. The caulking preferably contains either a styrene-based block copolymer resin, or a mixture of an olefin-based resin and an adhesive resin. A method for producing the building material includes a step of heating a caulking material to a temperature equal to or higher than a softening point of the caulking material, a step of forming a bead-like caulking by applying the heated caulking material onto a shiplap portion formed in a base material, and a step of coating the caulking with a caulking-coating material.

13 Claims, No Drawings

BUILDING MATERIAL AND METHOD FOR PRODUCING THE SAME

CROSS REFERENCE TO RELATED APPLICATIONS

This application is based on Japanese Patent Application No. 2014-037835 filed with the Japanese Patent Office on Feb. 28, 2014, the entire content of which is hereby incorporated by reference.

BACKGROUND OF THE INVENTION

1. Field of the Invention

The present invention relates to a building material preferable for use as a wall material, roof material, floor material or the like, and to a method for producing the building material.

2. Description of the Related Art

Inorganic materials composed mainly of water-settable inorganic powder such as cement and wooden reinforcing materials such as wood pulp fiber have conventionally been used as building materials. Since these types of the inorganic materials have superior bending strength and other physical properties, they are used as the building materials such as residential interior wall materials, external wall materials, roof materials or floor materials after being coated.

When a plurality of these building materials are combined to form walls, roofs and floors, gaps may be formed between these building materials, allowing rainwater to enter the gaps and reach the back side of the building materials. Therefore, shiplap portions are formed on the each ends of these building materials, and the entry of rainwater to the back sides of these building materials is prevented by joining these shiplap portions. However, since this alone is unable to prevent the entry of rainwater enough, a bead-like waterproof portion referred to as a caulking is formed on the shiplap portion.

For example, Japanese Patent Application Laid-open No. H11-30017 discloses a building board having a female shiplap portion and male shiplap portion formed on the periphery thereof, wherein a caulking is formed by depositing a caulking material on the male shiplap portion and female shiplap portion to enable the caulking to prevent the entry of rainwater to the back side.

SUMMARY OF THE INVENTION

However, even if the caulking is deposited in the manner described in the above-mentioned patent publication, there is concern over the caulking not adhering to the shiplap portion of the building material causing it to peel off. This is caused by low adhesive strength between the caulking and the shiplap portion of building material.

In addition, when the building material is used after being cut, the caulking may also peel off during cutting.

Moreover, although the caulking is required to have a certain degree of deformable elasticity since it is used to prevent the formation of gaps between the building materials by infilling the gaps. Since the elasticity of the caulking is imparted by oil depending on the caulking raw material, staining may occur due to bleeding of the oil and the like over time.

Thus, an object of the present invention is to provide a building material having a caulking on a shiplap portion that demonstrates a superior adhesion between the caulking and the shiplap portion, and to provide a method for producing the building material.

A building material in accordance with the present invention includes: a base material having a shiplap portion; a caulking formed in a form of a bead on the shiplap portion; and a caulking-coating film covering the caulking.

DESCRIPTION OF THE PREFERRED EMBODIMENTS

A present embodiment provides a building material having a caulking formed in a form of a bead on a shiplap portion in the building material. The caulking is covered by a caulking-coating film. As a result of the caulking covered with the caulking-coating film, adhesion between the caulking and the building material improves, cuttability of the caulking improves, bleeding of oil from the caulking over time is eliminated, deterioration of the caulking over time is suppressed, and weather resistance improves.

The caulking preferably contains at least one of a styrene-based block copolymer resin, and a mixture of an olefin-based resin and an adhesive resin. The embodiment has suitable strength, and has superior adhesion between the caulking and the shiplap portion of the building material.

The caulking is formed in a foamed state (having air bubbles inside) or is formed in a non-foamed state (not having air bubbles inside). Since the caulking is easily deformed if it is in the foamed state, in addition to demonstrating superior performance in filling in gaps between the shiplap portions overlapped or engaged each other by being deformed corresponding to the size of the gaps, this is also preferable since it prevents unevenness occurred between the building materials connected each other. In addition, in comparison with the non-foamed caulking, the foamed caulking demonstrates greater suppression of the bleeding of the oil, reduction of the amount of a raw caulking material for superior cost performance, and a suppression of the caulking peeling off from the shiplap portion because the foamed caulking is able to be cut easily.

If the caulking-coating film that covers the caulking is mainly composed of at least one of acrylic resin, acrylic urethane resin, acrylic silicon resin, fluororesin, alkyd resin, urethane resin, silicon resin, epoxy resin and particulate silica, the caulking-coating film is superior in adhesion with the caulking, weather resistance, and water resistance, so this embodiment is preferable. If the caulking and the shiplap portion are covered with a caulking-coating film of the same color, the color of the shiplap portion and the color of the caulking match and the caulking is not conspicuous in the gaps between the building materials after construction (after joining the shiplap portions), so this embodiment is preferable.

The caulking is formed on a coated surface (i.e. a surface of the shiplap portion covered with a base-coating film) of the shiplap portion of the base material or is formed directly on the shiplap portion of the base material without the base-coating film. If the caulking is formed on the base-coating film mainly composed of at least one of an acrylic resin, acrylic urethane resin, acrylic silicon resin, fluororesin, alkyd resin, urethane resin, silicon resin, epoxy resin and particulate silica, the caulking demonstrates more superior adhesive strength, so this embodiment is preferable. The coated surface of the shiplap portion refers to the coasted surface regardless of the front side surface or the back side surface of the shiplap portion. In the case of the back side surface of the shiplap portion is coated with the base-coating film, the caulking is preferably formed on the back side surface of the shiplap portion.

In addition, the present embodiment also provides a method for producing a building material having a caulking on a shiplap portion. The production method includes: a step of heating a caulking material to a temperature equal to or higher than a softening point of the caulking material, a step of forming a bead-like caulking by applying the heated caulking material onto a shiplap portion formed in a base material, and a step of coating the caulking with a caulking-coating material. As a result, the building material has the caulking that demonstrates superior cuttability, weather resistance and adhesion with the shiplap portion of the building material. The building material has the caulking that also demonstrates exhibits little bleeding of oil over time and for which deterioration over time is suppressed.

If a raw material containing a styrene-based block copolymer resin or a raw material containing a mixture of an olefin-based resin and an adhesive resin is used for the caulking material, the resulting caulking has suitable strength and demonstrates more superior adhesion with the shiplap portion of the building material, thereby making this preferable.

In the step of heating the caulking material, the caulking material is heated without foaming or is heated while foaming with an inert gas. The use of the caulking material with the foaming offers the advantages that the resulting caulking is deformable corresponding to the size of gaps between the building materials during construction (when joining the shiplap-portions), performance in terms of filling in the gaps is superior, unevenness occurred between building materials is prevented, bleeding of oil is suppressed, the amount of raw materials used is reduced for superior cost performance, and the caulking is cut easily, thereby making this preferable.

In the step of coating a caulking-coating material on the caulking, if the caulking-coating material mainly composed of at least one of an acrylic resin, acrylic urethane resin, acrylic silicon resin, fluororesin, alkyd resin, urethane resin, silicon resin, epoxy resin and particulate silica is used, adhesion with the caulking is superior and weather resistance and water resistance are also superior, thereby making this preferable. If a colored caulking-coating material is applied to both the caulking and the shiplap portion, the color of the shiplap portion and the color of the caulking match, the caulking is not conspicuous in the gaps between building materials after construction (after joining the shiplap portions) and appearance is not impaired, thereby making this preferable.

The caulking material is directly applied on the shiplap portion of the base material or on the coated surface (i.e. the surface of the shiplap portion covered with the base-coating film). If the caulking material is applied to the surface of the coated shiplap portion coated with the base-coating material composed mainly of at least one of an acrylic resin, acrylic urethane resin, acrylic silicon resin, fluororesin, alkyd resin, urethane-resin, silicon resin, epoxy resin and particulate silica, the caulking that is formed demonstrates more superior adhesive strength with the coated shiplap-portion, thereby making this preferable.

Moreover, if the caulking formed is heated at a temperature equal to or lower than the softening point of the caulking material, adhesive strength of the caulking with the shiplap portion improves, thereby making this preferable. The heating is carried out immediately after applying the caulking material or is carried out after coating the formed caulking with the caulking coating-material.

According to the present embodiment, the building material having the caulking on the shiplap portion demonstrates superior cuttability, adhesion with the building material, and almost free of staining caused by bleeding of oil and the like. The production method of the building material are also provided.

The following provides a detailed explanation of an embodiment of the present invention.

A building material of the present embodiment has a base material having a shiplap portion. The building material has a caulking on the shiplap portion.

Examples of the base material of the building material include a ceramic siding material, an inorganic material and an organic material.

Examples of the ceramic siding material include a wooden fiber-reinforced cement material, a fiber-reinforced cement material, a fiber-reinforced cement-calcium silicate material, and a slag gypsum material. Examples of the inorganic material include a metal-based siding material and an ALC (autoclaved lightweight concrete). Examples of the organic material include a hard board, an insulation board and a plastic board.

The shape of the base material includes, but not limited to, a flat plate member, L-shaped member in cross section, and curved plate member. The surface of the base material is, but not limited to, smooth and patterned indented.

The shiplap portion is formed in the side portion or end portion of the base material to engage or overlap another shiplap portion of the adjacent building material.

The surface of the shiplap portion of the base material has either a base-coating film formed or not. Although there are no particular limitations on the base-coating film, if the base-coating film is formed with at least one of an acrylic resin, acrylic urethane resin, acrylic silicon resin, fluororesin, alkyd resin, urethane resin, silicon resin, epoxy resin and particulate silica, adhesion with the caulking is superior. These materials also make weather resistance and water resistance superior, so the use of these materials is preferable.

The caulking is formed in the form of a bead on the shiplap portion. The bead refers to continuous deposit of a material of the caulking having a semicircular cross-section or a nearly spherical cross-section similar to the semicircular. Although there are no particular limitations on the material of the caulking, if it contains either a styrene-based block copolymer resin or a mixture of an olefin-based resin and adhesive resin, the caulking has suitable strength and demonstrates superior adhesion between the caulking and the shiplap portion of the building material, thereby making this preferable. Examples of the styrene-based block copolymer resins include styrene-butylene-ethylene-styrene copolymer resin, styrene-isobutylene-styrene copolymer resin and styrene-butadiene-styrene copolymer resin. Examples of the olefin-based resins include polypropylene resins having ethylene-propylene rubber finely dispersed therein. Examples of the adhesive resins include hydrogenated terpene-based resin, hydrogenated C9-based resin, hydrogenated C5-based resin and hydrogenated rosin-based resin.

The caulking is formed in foamed state (having air bubbles present inside) or is formed in a non-foamed state (not having air bubbles inside). Since the foamed caulking is easily deformed, it demonstrates superior performance in filling in gaps between the engaged or overlapped shiplap portions by being able to be deformed corresponding to the size of the gaps, so that it prevents unevenness from occurring between building materials, thereby making this preferable. In addition, the foamed caulking demonstrates greater suppression of bleeding of oil in comparison with the non-foamed caulking, while also enabling the amount of raw caulking material used to be reduced so as to offer superior cost performance. Moreover, the foamed caulking is able to be easily cut and offers superior resistance to be peeled off from the shiplap portion while the building material is cut. Therefore, the foamed caulking is preferable in terms of these advantages. Furthermore, the foamed caulking is obtained by mixing hot-melted caulking with an inert gas to increase the volume by two to five times.

Although caulking is typically formed on a front side surface of the shiplap portion, i.e. the face side of the building material, it is also formed on a back side surface of the shiplap portion.

In the present embodiment, the caulking is covered with a caulking-coating film. Although there are no particular limitations on the material of the caulking-coating film, if the caulking-coating film is formed with at least one of an acrylic resin, acrylic urethane resin, acrylic silicon resin, fluororesin, alkyd resin, urethane resin, silicon resin, epoxy resin and particulate silica, adhesion with the caulking is superior and weather resistance and water resistance are also superior, thereby making this preferable. Only the caulking is covered with the caulking-coating film or both the caulking and the shiplap portion are also covered with the caulking-coating film. In the latter case, if the caulking and the shiplap portion are covered with a caulking-coating film of the same color, the color of the shiplap portion and the color of the caulking match, the caulking is not conspicuous in the gaps between building materials after construction (after joining the shiplap portions) and appearance is not impaired, so the caulking-coating film covering both the caulking and the shiplap portion in the same color is preferable.

The method for producing the building material of the present embodiment includes a step of heating the caulking material to a temperature equal to or higher than the softening point of the caulking material, a step of forming bead-like caulking by applying the heated caulking material onto the shiplap portion of the building material, and a step of coating the caulking with a caulking-coating material. As a result, the building material having the caulking is provided that demonstrates superior cuttability, i.e. a performance of being easily cut, weather resistance and adhesion with the shiplap portion. The bleeding of oil over time and the aged deterioration of the building material are suppressed.

Although there are no particular limitations on the caulking material, if the raw material of the caulking containing a styrene-based block copolymer resin or the raw material containing a mixture of an olefin-based resin and an adhesive resin is used, the resulting caulking has suitable strength and demonstrates more superior adhesion with the shiplap portion, so these raw material are preferable.

In the step of heating the caulking material to a temperature equal to or higher them the softening point of the caulking material, the caulking material is heated while foaming with an inert gas or is simply heated without the foaming. In case that the caulking material is applied on the shiplap portion with the foaming, the resulting caulking is in a foamed state to offer superior deformable performance corresponding to the size of gaps occurred between the adjacent shiplap portions during construction (when joining the shiplap portions)to infill the gaps. The unevenness occurred between building materials and bleeding of oil are suppressed. The amount of raw materials of the caulking material used is reduced to provide superior cost performance, and the caulking is cut easily. In terms of these advantages, the forming of the caulking with foaming is preferable.

In the step of applying the caulking material, the caulking material is applied directly to the surface of the shiplap portion of the base material or is applied to the base-coated surface (i.e. the surface of the shiplap portion covered with the base-coating film). In case that the caulking material is applied on the surface of the shiplap portion coated with the base-coating material composed mainly of at least one of an acrylic resin, acrylic urethane resin, acrylic silicon resin, fluororesin, alkyd resin, urethane resin, silicon resin, epoxy resin and particulate silica, the caulking formed has more superior adhesive strength, so these caulking material are preferable. The base-coated surface of the shiplap portion refers to a base-coated surface regardless of whether the front side surface or back side surface of the shiplap portion, and in the case of a shiplap portion in which the back side surface is coated, the caulking is preferably formed on that back side surface.

In the step of coating the caulking with the caulking-coating material, if the caulking-coating material is composed mainly of at least one of an acrylic resin, acrylic urethane resin, acrylic silicon resin, fluororesin, alkyd resin, urethane resin, silicon resin, epoxy resin and particulate silica, adhesion with the caulking, weather resistance, and water resistance are superior, so the caulking-coating material containing these substances is preferable. The caulking-coating film covers the caulking only or covers the caulking and the shiplap portion both. If a colored caulking-coating film covers both the caulking and the shiplap portion, the color of the shiplap portion and the color of the caulking match, so that the caulking is not conspicuous in the gaps between the building materials after construction (after joining the shiplap portions) and appearance is not impaired. Therefore, the coating both the caulking and the shiplap portion in the same color is preferable.

Moreover, if additionally heating the caulking formed at a temperature equal to or lower than the softening point of the caulking material, the adhesive strength of the caulking is enhanced, so the heating of the caulking is preferable. The heating is carried out immediately after applying the caulking material on the shiplap portion or carried out after coating the caulking formed on the shiplap portion with the caulking-coating material.

The following indicates examples of the present embodiment.

A base-coating material was applied onto an entire surface (including a shiplap portion) of a wooden fiber-reinforced cement board as a base material having the shiplap portion on one end followed by being dried for about 3 minutes with a dryer at about 100° C. to form a base-coating film. Next, a caulking material foamed with nitrogen gas was applied onto the surface of the shiplap portion and a caulking extending in the form of a bead along the lengthwise direction of the shiplap portion was formed on the shiplap portion to produce building materials of samples 1 to 12. Note that the samples 1 to 9 and 11 were coated with a caulking-coating material over the entire surface of the wooden fiber-reinforced cement board (including the shiplap portion) after forming the caulking. In addition, the samples 1 to 5, 7 to 9, and 11, were heated in the entire surface of the wooden fiber-reinforced cement board including the caulking formed on the shiplap portion. The type of the caulking-coating material applied on the caulking, material, softening point and foam ratio of the caulking-coating material, heating conditions and width and height of the caulking are as described in Table 1.

The building materials of samples 1 to 12 were measured for caulking adhesive strength, cuttability and staining over time, and those results are shown in Table 1.

The caulking adhesive strength was measured as follows. First, the sample prepared was placed in a constant-temperature chamber at 20° C. for 24 hours. Next, the caulking was peeled off from the sample starting on the end of the caulking over a distance of about 10 cm. Then, the peeled caulking was attached to a spring balance. After that, the load value [gram] at which the adhered surface of the caulking began to peel off from the shiplap portion of the sample was measured with pulling up the spring balance vertically with the caulking. Namely, the value at which the caulking began to peel off when the caulking pulled was taken to be the caulking adhesive strength.

The cuttability was measured as follows. After cutting a caulking of a sample in use of a circular saw perpendicularly to the direction in which the bead of the caulking of extends, a length of the caulking peeled off from the shiplap portion of the base material was measured. In the case that the length of the caulking peeled off from the shiplap portion was 3.0 mm or longer from the cut end of the caulking, it was evaluated as "bad" shown with "x" in Table 1. In all other cases, i.e. the length of the caulking peeled off was shorter than 3.0 mm, it was evaluated as "good" shown with "a".

Staining over time was measured as follows. The state of the caulking was checked after the caulking was irradiated with a sunshine weather meter for 1000 hours. In the case of the presence of staining attributable to bleeding of oil and the like, it was evaluated as "bad" shown with "x" in Table 1. In the case of almost the absence of staining, it was evaluated as "good" shown with "o".

TABLE 1

| | | | | Sample 1 | Sample 2 | Sample 3 | Sample 4 | Sample 5 | Sample 6 |
|---|---|---|---|---|---|---|---|---|---|
| Samples | Base-coating material coated under caulking | Main component | | Acrylic resin | Particulate silica | Acrylic silicon resin | Acrylic resin | Acrylic resin | Acrylic Resin |
| | Caulking material | Material | | *1 | *1 | *1 | *1 | *1 | *1 |
| | | Softening point | ° C. | 117 | 117 | 117 | 117 | 117 | 117 |
| | | Heating temp. | ° C. | 165 | 165 | 165 | 165 | 165 | 165 |
| | | Foam ratio | Times | 2.7 | 2.7 | 2.7 | 2.7 | 2.7 | 2.7 |
| | Caulking-Coating material coated over caulking | Main component | | Acrylic resin | Acrylic resin | Acrylic resin | Acrylic resin | Acrylic resin | Acrylic resin |
| Heating conditions after forming caulking | Dryer | | | Jet dryer | Jet dryer | Jet dryer | Jet dryer | Jet dryer | — |
| | Time | | Min. | 1 | 1 | 1 | 2 | 3 | — |
| | Board temperature at Dryer outlet | | ° C. | 60 | 60 | 60 | 70 | 78 | — |
| Caulking | Width | | mm | 3 | 3 | 3 | 3 | 3 | 3 |
| | Height | | mm | 2 | 2 | 2 | 2 | 2 | 2 |
| Physical properties | Caulking adhesive strength | | g | 130 | 130 | 130 | 150 | 170 | 110 |
| | Cuttability | | | ○ | ○ | ○ | ○ | ○ | ○ |
| | Staining over time | | | ○ | ○ | ○ | ○ | ○ | ○ |

| | | | | Sample 7 | Sample 8 | Sample 9 | Sample 10 | Sample 11 | Sample 12 |
|---|---|---|---|---|---|---|---|---|---|
| Samples | Base-coating material coated under caulking | Main component | | Acrylic resin | Acrylic resin | Acrylic resin | Acrylic resin | Acrylic resin | Acrylic resin |
| | Caulking material | Material | | *2 | *2 | *3 | *2 | *2 | *3 |
| | | Softening point | ° C. | 125 | 125 | 115 | 125 | 125 | 115 |
| | | Heating temp. | ° C. | 165 | 165 | 165 | 165 | 165 | 165 |
| | | Foam ratio | Times | 2.8 | 2.8 | — | — | 3 | — |
| | Caulking-Coating material coated over caulking | Main component | | Acrylic resin | Acrylic resin | Acrylic resin | — | Acrylic resin | — |
| Heating conditions after forming caulking | Dryer | | | Box oven | Box oven | Box oven | — | Box oven | — |
| | Time | | Min. | 10 | 20 | 10 | — | 10 | — |
| | Board temperature at Dryer outlet | | ° C. | 86 | 95 | 86 | — | 130 | — |
| Caulking | Width | | mm | 3 | 3 | 3 | 3 | *4 | 3 |
| | Height | | mm | 2 | 2 | 2 | 2 | *4 | 2 |
| Physical properties | Caulking adhesive strength | | g | 100 | 103 | 130 | 36 | *4 | 90 |
| | Cuttability | | | ○ | ○ | ○ | X | — | ○ |
| | Staining over time | | | ○ | ○ | ○ | X | — | X |

*1: Styrene-butylene-ethylene-styrene copolymer resin
*2: Mixture of olefin-based resin and hydrogenated terpene-based resin
*3: Styrene-butylene-styrene copolymer resin
*4: Unable to be measured due to melting of caulking In regard to the samples 10 and 12 of the building materials having the caulking not coated with the caulking-coating material, both the, samples 10 and 12 were evaluated as "x (i.e. bad)" for the occurrence of staining over time caused by bleeding of oil. In addition, the sample 10 demonstrated low adhesive strength of the caulking of about 36.0 g.

On the other hand, the samples 1 to 9 of the building materials having the caulking coated with the caulking-coating material, all the samples 1 to 9 exhibited high adhesive strength of the caulking of 100.0 g or more and were evaluated as "o (i.e. good)" for the cuttability as well as for the staining over time since the samples 1 to 9 were almost free of the occurrence of bleeding of oil. In particular, although the samples 7 and 8 used the same caulking material as the sample 10 while the sample 9 used the same caulking material as the sample 12, there were no problems with respect to the adhesive strength of the caulking, cuttability or staining over time. In addition, although the samples 1, 4, 5 and 6 of the building materials were produced under the same conditions except that the sample 6 was not heated after the caulking formation, the samples 1, 4 and 5 heated after the caulking formation demonstrated higher adhesive strength of the caulking in comparison with the sample 6, which was not heated after the caulking formation, thereby suggesting that the adhesive strength of the caulking was improved as a result of the heating. Furthermore, in the case of the sample 11 having the caulking coated with the caulking-coating material, since the heating temperature after the caulking formation was higher than the softening point of the caulking material, the caulking ended up melting and did not form the bead, thereby preventing it from demonstrating the function of a waterproof portion.

Although the above has provided an explanation of embodiments of the present invention, the present invention is not limited thereto, but rather can be modified in various ways within the scope of the present invention as described in the claims.

As described above, the present embodiment provides the building material having the caulking on the shiplap portion to demonstrate superior cuttability and adhesion with the connected adjacent building material and to demonstrate almost free of staining attributable to bleeding of oil and the like, and the production method of the building material.

What is claimed is:

1. A building material comprising: a base material having a shiplap portion;
   a base-coating film covering the shiplap portion of the base material;
   a foamed caulking material extending along a lengthwise direction on the base-coating film on the shiplap portion, so that the foamed caulking material has a form of a semicircular or nearly spherical shape in a cross-section; and
   a caulking-coating film covering the foamed caulking material, wherein
   the base material is a ceramic siding material, metal-based siding material, or autoclaved lightweight concrete material,
   the foamed caulking material is comprised of at least one resin material selected from the group consisting of styrene-butylene-ethylene-styrene copolymer resin, styrene-isobutylene-styrene copolymer resin, styrene-butadiene-styrene copolymer resin, and a mixture of an olefin-based resin and an adhesive resin,
   wherein when the foamed caulking material is a mixture of the olefin-based resin and the adhesive resin,
   the olefin-based resin is comprised of a polypropylene resin and ethylene-propylene rubber finely dispersed in the polypropylene resin, and
   the adhesive resin is at least one resin selected from the group consisting of hydrogenated terpene-based resin, hydrogenated C9 based resin, hydrogenated C5 based resin and hydrogenated rosin-based resin, and
   the base-coating film and the caulking-coating film are comprised of the same resin material, and the caulking-coating film covers the foamed caulking material and the base-coating film on the shiplap portion.

2. The building material according to claim 1, wherein both the base-coating film and the caulking-coating film are comprised of at least one material selected from group consisting of an acrylic resin, acrylic urethane resin, acrylic silicon resin, fluororesin, alkyd resin, urethane resin, silicon resin, and epoxy resin.

3. A method for producing a building material, comprising the steps of:
   providing a base material having a shiplap portion and a base-coating film covering the shiplap portion;
   heating a caulking material to a temperature equal to or higher than a softening point of the caulking material,
   forming a foamed caulking material by applying the heated caulking material onto the shiplap portion of the base material, so that the foamed caulking material extends along a lengthwise direction on the base-coating film on the shiplap portion and the foamed caulking material has a form of a semicircular or nearly spherical shape in a cross-section, and
   coating the foamed caulking material with a caulking-coating material, wherein
   the base material is a ceramic siding material, metal-based siding material, or autoclaved lightweight concrete material,
   the foamed caulking material is comprised of at least one resin material selected from the group consisting of styrene-butylene-ethylene-styrene copolymer resin, styrene-isobutylene-styrene copolymer resin, styrene-butadiene-styrene copolymer resin, and a mixture of an olefin-based resin and an adhesive resin,
   wherein when the foamed caulking material is a mixture of the olefin-based resin and the adhesive resin,
   the olefin-based resin is comprised of a polypropylene resin and ethylene-propylene rubber finely dispersed in the polypropylene resin, and
   the adhesive resin is at least one resin selected from the group consisting of hydrogenated terpene-based resin, hydrogenated C9-based resin, hydrogenated C5-based resin and hydrogenated rosin-based resin, and
   the base-coating film and the caulking-coating film are comprised of the same resin material, and the caulking-coating film covers the foamed caulking material and the base-coating film on the shiplap portion.

4. The method for producing a building material according to claim 3, wherein
   the foamed caulking material is comprised of the mixture of the olefin-based resin and the adhesive resin.

5. The method for producing a building material according to claim 3, wherein
   the caulking material is foamed with an inert gas in the step of heating the caulking material.

6. The method for producing a building material according to claim 3, wherein both the caulking-coating material and the base-coating material are comprised of at least one material selected from group consisting of an acrylic resin, acrylic urethane resin, acrylic silicon resin, fluororesin, alkyd resin, urethane resin, silicon resin, and epoxy resin.

7. The method for producing a building material according to claim 3, further comprising
a step of coating the shiplap portion with the base-coating material before the step of forming the foamed caulking material.

8. The method for producing a building material according to claim 3, further comprising
a step of heating the caulking at a temperature equal to or lower than a softening point of the caulking after the step of forming the bead-like caulking.

9. The building material according to claim 1, wherein the foamed caulking material is comprised of the mixture of the olefin-based resin and the adhesive resin.

10. The building material according to claim 1, wherein the foamed caulking material has a foaming ratio of 2 to 5 times by volume.

11. The building material according to claim 1, wherein the foamed caulking material is composed of said at least one resin material and an inert gas, so that the foamed caulking material has a foaming ratio of 2 to 5 times by volume.

12. The building material according to claim 1, wherein the foamed caulking material is obtained by hot melting said at least one resin material and mixing with an inert gas, to increase a volume by 2 to 5 times.

13. The method for producing a building material according to claim 3, wherein
the caulking material is foamed with an inert gas in the step of heating the caulking material, so that the foamed caulking material has a foaming ratio of 2 to 5 times by volume.

* * * * *